United States Patent [19]

Newman et al.

[11] Patent Number: 4,899,174

[45] Date of Patent: Feb. 6, 1990

[54] METHOD OF MAKING LED ARRAY PRINTHEAD WITH TAB BONDED WIRING

[75] Inventors: David A. Newman, Rochester; William R. Laubengayer, Holley; William B. Scott, Jr., Bergen, all of N.Y.

[73] Assignee: Eastman Kodak Company, Rochester, N.Y.

[21] Appl. No.: 373,971

[22] Filed: Jun. 30, 1989

Related U.S. Application Data

[62] Division of Ser. No. 228,641, Aug. 5, 1988, Pat. No. 4,851,862.

[51] Int. Cl.[4] .......................... G01D 9/42; G01D 15/06; G01D 9/00

[52] U.S. Cl. .......................... 346/107 R; 346/1.1; 346/160

[58] Field of Search .......................... 346/107 R, 160, 154, 346/76 PH, 1.1; 358/302; 357/17, 45, 30; 372/43; 313/500

[56] References Cited

U.S. PATENT DOCUMENTS

| | | | |
|---|---|---|---|
| 4,400,709 | 8/1983 | Kermadec | 346/154 |
| 4,506,272 | 3/1985 | Arai | 346/76 PH |
| 4,595,934 | 6/1986 | Arai | 346/76 PH |
| 4,635,073 | 1/1987 | Hanson | 346/140 R |
| 4,779,108 | 10/1988 | Inoue | 346/160 |
| 4,820,013 | 4/1989 | Fuse | 357/30 |

OTHER PUBLICATIONS

Tab Technology Tackler High Density Interconnections, Electronics Packaging and Production, (12/84).

*Primary Examiner*—Bruce A. Reynolds
*Assistant Examiner*—Scott A. Rogers
*Attorney, Agent, or Firm*—Armin B. Pagel

[57] ABSTRACT

An LED array module for use in an LED array printhead is fabricated on a frame of tape-automated bonding (TAB) tape that provides all of the wiring for connecting the chips together, for connecting the module to one or more external circuit boards and for testing the module; thereby protecting the delicate components and allowing the module to be completely tested prior to excising it from the TAB frame and mounting it to the printhead support member.

2 Claims, 3 Drawing Sheets

METHOD OF MAKING LED ARRAY PRINTHEAD WITH TAB BONDED WIRING

This is a divisional of application Ser. No. 228,641 filed Aug. 5, 1988, now U.S. Pat. No. 4,851,862 issued July 25, 1989.

FIELD OF THE INVENTION

The invention relates to LED array printheads and more particularly to such a printhead assembled by mounting to a common support member a plurality of individual LED array assembly modules, each of which comprises an LED array chip and two control chips. Each module is fabricated on a frame of tape-automated bonding (TAB) tape that provides all of the wiring for connecting the chips together, for connecting the module to one or more external circuit boards and for testing the module; thereby protecting the delicate components and allowing the module to be completely tested prior to excising it from the TAB frame and mounting it to the printhead support member.

DESCRIPTION OF THE PRIOR ART

A printhead of the type to which the present invention is directed comprises a row of uniformly spaced light sources that can be individually energized to expose a photoreceptor or other information receiving medium to reproduce an image pattern. A typical LED array of this type for standard DIN A4 paper dimensions would be about 216 mm long. The individual light sources are very small and very closely spaced, e.g. 160 per cm, which makes it impossible at the present state of the art to provide a full length array in one piece. Accordingly, the array comprises a number of individual LED chips, each being typically less than 10 millimeters long, which are mounted in endwise relation to one another to provide the entire array.

To control the energization of the individual LED sites, each LED chip is connected along each edge to a respective control chip, with the number of individual wiring connections to the LED chip being equal at least to the number of LED sites on that chip.

It has been recognized in the past that it is highly desirable to mount the LED chips and the control chips directly to the main support member of the printhead, with the chips thereafter being connected together, which is customarily accomplished by automatic wire bonding techniques. Both the LED and the control chips can be individually tested prior to mounting them to the support member, but minor variations raise the possibility that even though the LED and control chips appear acceptable individually, they may not perform satisfactorily together. Once the chips are bonded to the support member and wired together, removing a chip for replacement is prohibitively difficult. Accordingly, the most common practice has been to pre-assemble modules by bonding the LED and control chips of each module to a respective carrier member, wiring the chips together and then testing the resulting subassembly before bonding the carrier member to the common support member. This approach adds another step to the assembly process and complicates the already stringent requirement that the top surfaces of the LED chips be very accurately coplanar, because the carrier member and the corresponding additional bonding layer are interposed between the LED chips and the support member.

Tape automated bonding or TAB is a technology that has become increasingly popular in recent years as an alternative to individual wire bonding of semiconductor devices. The TAB process is well known in the electronics industry and is described generally, for example, in an article entitled TAB Technology Tackles High Density Interconnections, Electronic Packaging and Production, December 1984, published by Cahners Publishing Company. Briefly, the TAB process involves forming conductor wires on a piece of plastic film, which generally is similar in appearance to conventional 35 mm camera film. Various openings are formed to accommodate the semiconductor chips and to expose portions of the connector wires, which are held accurately in place by the surrounding plastic material and thereby aligned accurately with corresponding bonding pads on the chips, to which the individual wires are securely bonded. Various means can be used to accomplish the bonding, e.g. soldering, thermal compression bonding, thermosonic bonding, laser bonding, etc.

Different types of printheads have taken advantage of some of the benefits of TAB technology, e.g. the stylus bar printhead disclosed in U.S. Pat. No. 4,400,709 and the thermal printhead disclosed in U.S. Pat. No. 4,506,272. The stylus bar printhead disclosed in the U.S. Pat. No. '709 includes only one semiconductor chip in each module and each module is tested prior to installation. The thermal printhead disclosed in the U.S. Pat. No. '272 is more closely analogous to the LED printhead to which the present invention is directed, and TAB bonding is used to connect a control chip to the corresponding thermal elements of the printhead. However, the array of thermal elements in this head is made in one continuous piece rather than as an assemblage of subunits, which means that TAB bonding to the thermal array cannot be done on a modular basis prior to mounting the array to its support member.

The TAB process has also been used previously to assemble pre-testable LED array modules of the type to which the present invention is directed, but the TAB connections have comprised two or more separate pieces or frames of TAB tape, e.g. one piece for the connection to one side of the diode array chip and another piece for the connection to the other side of that chip. This procedure requires multiple alignment and assembly operations of the module and poses a substantial likelihood of damage to the fragile module during its assembly and testing.

In summary, while the TAB process has been used previously in assembling LED and other types of printhead devices and for connecting such devices to other circuitry, such known applications have failed to exploit the TAB process to provide modules that can be tested while still supported in the one-piece TAB frame before being mounted to the support member; thereby minimizing repair problems, eliminating the need for separate means for supporting the chips, unless such a structure is desired for other reasons, and protecting the fragile module from damage except during their final assembly to the printhead support member.

SUMMARY OF THE INVENTION

In accordance with the present invention, a single frame of TAB tape includes all of the connections necessary to interconnect an LED array chip with its two control chips, to provide connections between the control chips and external circuitry and to provide test pads for the entire module. Only after the chips are installed and connected and the resulting testable module has been tested and approved, is excess film and conductor removed to provide the final assembly module, which is then mounted to the support member and connected to its external circuitry to complete the assembly process. If the test detects faults that can be corrected, e.g. by laser trimming to change a resistive value or by rebonding a faulty connection, such procedures can be carried out easily while the module is still supported and protected by the tape.

Various means for practicing the invention and other advantages and novel features thereof will be apparent from the following detailed description of an illustrative preferred embodiment, reference being made to the accompanying drawings in which.

DESCRIPTION OF THE ILLUSTRATIVE PREFERRED EMBODIMENT

Figure 1:
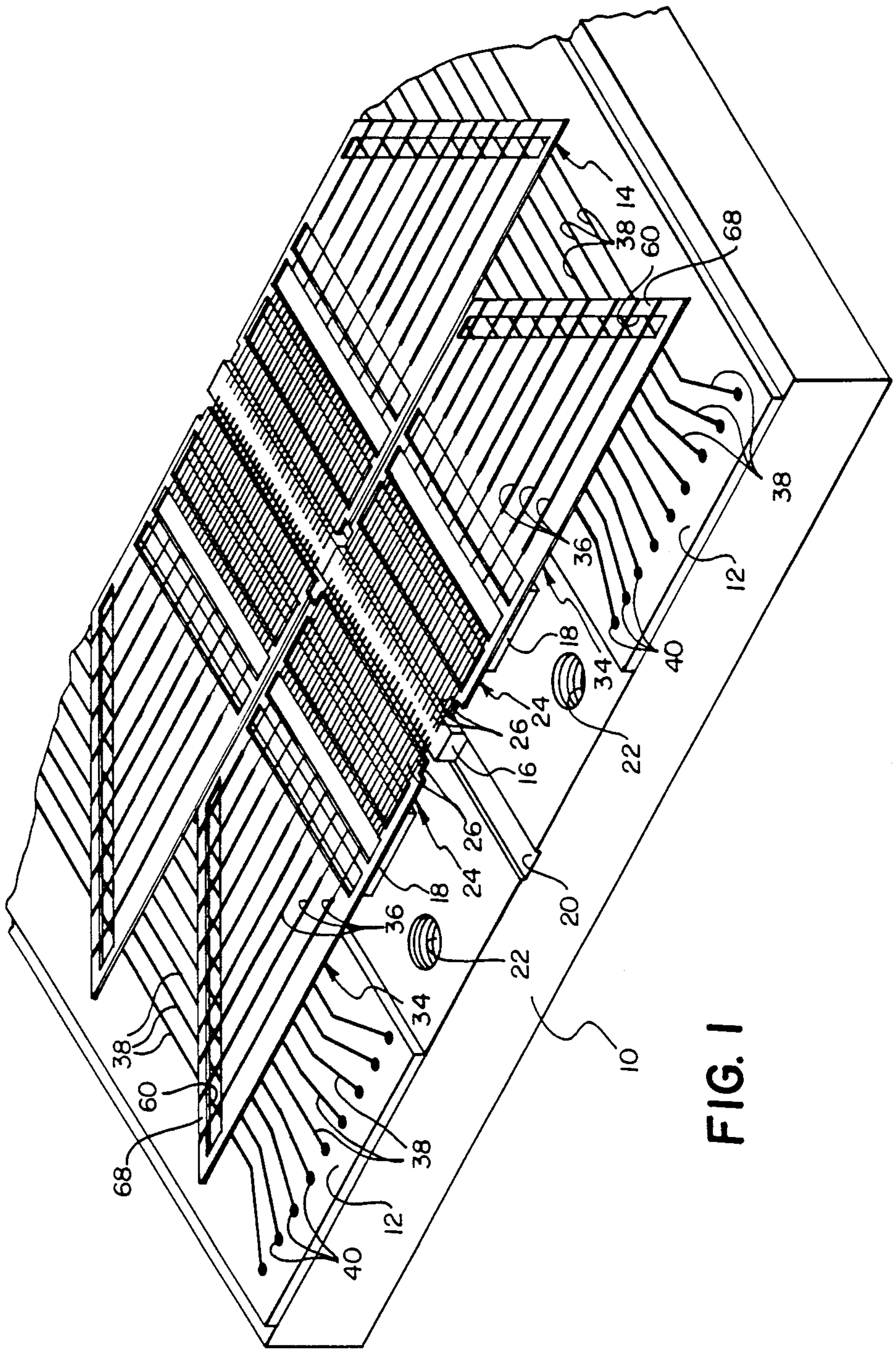
FIG. 1 is a fragmentary perspective view of a LED printhead according to a preferred embodiment of the invention comprising a plurality of LED array assembly modules mounted to a support member and connected to circuit board means carried by that member.

The illustrative printhead according to a preferred embodiment of the invention that is partially shown in FIG. 1 comprises an elongate support member or bar 10 to which are initially cemented or otherwise mounted two circuit boards 12. A plurality of LED array assembly modules 14, only two of which are shown, are then cemented or otherwise attached to the support member by means of their respective LED array chips 16 and their control chips 18, so that the light emitting diode sites of the array chips are mutually aligned and are uniformly spaced along the full length of the complete LED array. The diode chips can be located in a shallow slot 20 to facilitate their accurate alignment. The support member 10 is typically made of metal having approximately the same coefficient of thermal expansion as that of the support material of the LED arrays, which is typically gallium arsenide. Mounting holes 22 at each end of the support member are used to anchor pedestals that support a so-called Selfoc lens assembly or the like, not shown, in alignment with the light emitting diode sites, to image the diodes in the plane of the photo receptor or other photosensitive medium. The support member 10 is typically provided, for example on its bottom face, with cooling means, not shown, such as a finned metal heat sink and radiator, to dissipate heat generated by the LED array chips and by the control chips.

Figure 2:
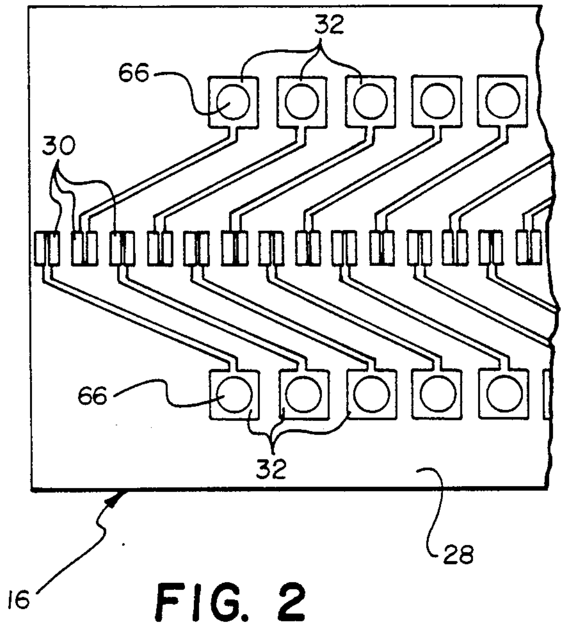
FIG. 2 is a fragmentary plan view of a portion of an individual LED array chip.

Each module comprises internal regions 24 having a large number of closely spaced wires 26 that connect bonding pads of the array chip 16 to corresponding bonding pads of the respective control chips 16. FIG. 2 shows a portion of one array 16, which comprises a gallium arsenide support member 28 on which are provided light emitting diode sites 30 connected to respective bonding pads 32. External module regions 34 comprise fewer and more widely spaced wires 36 that connect the respective control chips to corresponding conductor strips 38 of the respective circuit boards 12, which, in turn, include bonding pads 40 by which the printhead is connected to additional power source and to control electronics external to the printhead itself.

As is well known in the art, each diode array is grounded to the support member by electrically conductive cement or the like and requires at least as many wiring connections to the control chips as there are light emitting sites in that array. Fewer connections are necessary between the control chips and the circuit boards; one function of such a control chip being to reduce the number of connections needed by controlling the timing and duration of individual light emitting sites.

Although the drawings show twenty-nine wires connected to each edge of each LED array chip and nine wires connecting each control chip to a circuit board, in an actual device which the drawings are intended to represent, a typical array chip might be about 8 mm long with one hundred twenty-eight light emitting sites and sixty-four wires bonded to each edge and each corresponding control chip might have twenty or more wires connecting it to a circuit board. If design parameters dictate a significantly larger number of connections between the circuit boards and the control chips, multilayer circuit boards can be employed.

Figure 3:
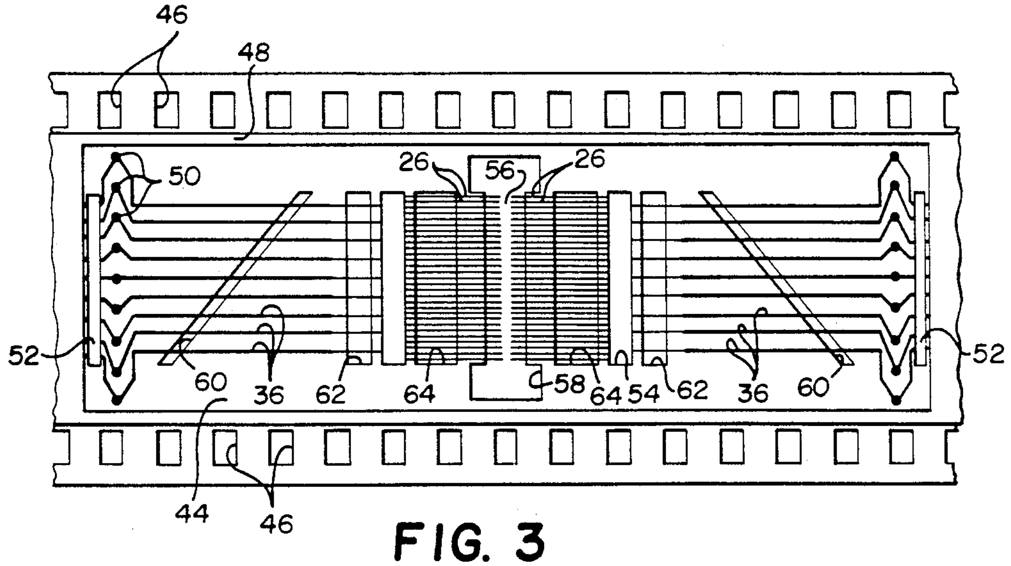
FIG. 3 is a plan view of a frame of TAB tape to which electronic chip components are bonded during the production of a module of the type shown in FIG. 1.

FIG. 3 shows a frame 42 of so-called two layer TAB tape according to the invention, comprising an elongate strip of thin plastic film 44, provided along its edges with typical sprocket or alignment holes 46. Metallic conductor material, typically copper protected by a thin layer of gold or tin plating, is adhered to the top face of the plastic film to provide a border area 48 used in producing the TAB frame wires or conductor paths, which include the closely spaced parallel wires 26 that ultimately connect a LED array chip to the control chips and the widely spaced parallel wires 36 that ultimately connect the control chips to their respective circuit boards. At their outer ends, wires 36 are provided with respective test pads 50, spaced apart by a greater distance than are the parallel portions of those wires. Initially, all of the wires are electrically connected to each other and to the border area material to provide electrical conduction for electroplating, but they are subsequently isolated into two regions of widely spaced wires and two regions of narrowly spaced wires by end windows 52, by intermediate windows 54 and by the gap 56 between the spaced apart confronting wire ends in central window 58. Openings 60, 62 and 64 are also provided through the film but, unlike windows 52, 54 and 58, these openings are traversed by the corresponding wires. These windows and openings are accurately located relative to each other and to the sprocket or alignment holes 46 along the edges of the TAB frame. Although the windows can be formed in the TAB frame by mechanical punching means, it is preferable to produce both the windows and the openings by chemical means because of the fragility of the wires, particularly those in the closely spaced groups of wires. It should be noted that, at this stage, only the wire ends that will be connected to the diode array chip 16 are cantilevered beyond the plastic film, i.e. not supported at both ends in a region free of supporting plastic, but the unsupported wire ends are quite short and are protected from accidental contact by being within window 58. The fabrication of the TAB frame can be accomplished in various ways, as summarized in the previously identified article, and, if desired, the conductive material can be sandwiched between two layers of plastic material with the same arrangement of windows and openings.

Figure 4:
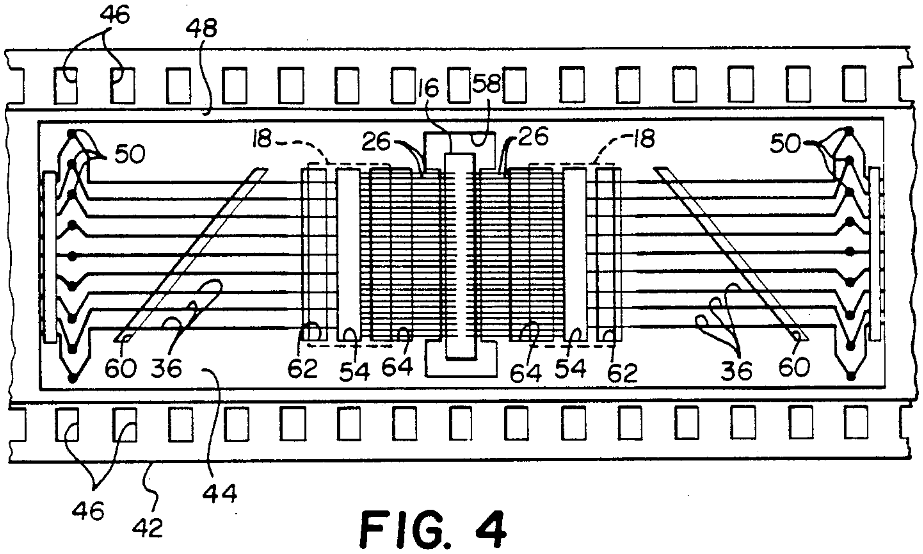
FIG. 4 corresponds to FIG. 3 but shows a testable module comprising the TAB tape frame with the electronic chip components bonded in place.

FIG. 4 shows the illustrative testable module comprising a frame of TAB tape with a diode array chip 16 received in window 58 and held accurately in place by the many closely spaced wires 26 bonded to the array chip. Control chips 18 are similarly aligned with their corresponding windows 54 and are held in place by the widely spaced wires 36 bonded to opposite edges those chips within the respective openings 62 and 64. So called bumps are provided on the bonding pads of the chips or on the corresponding surfaces of the TAB wires, which is well known in the art and also described in the above-cited article. These bumps raise the TAB wires above the surface of the semiconductor material to prevent short circuiting, provide additional material to simplify bonding and also at least partially compensate for the thickness of the plastic tape material. In practicing the present invention it is preferable that such bumps be on the chips rather than on the TAB wires, as shown at numeral 66 in FIG. 2, because of the very small dimensions involved and the relative fragility of the wires.

To install the chips in the TAB frame, which can be separate or still part of a continuous web, the chips are held in a jig that also positions the TAB frame, for example by means of positioning pins engageable in corresponding ones of the alignment holes 46. Either the chips or the TAB frame or both can be adjusted relative to each other to achieve the required mutual alignment, whereupon the TAB wires are bonded to the corresponding bonding pads of the chips, as previously described.

After the TAB bonding is completed, the resulting TAB frame module can be tested while still supported by the TAB frame by applying appropriate electrical probes to test pads 50. If desired, the test procedure and repair procedures can be accomplished while the TAB frame is still in the assembly jig.

Figure 5:
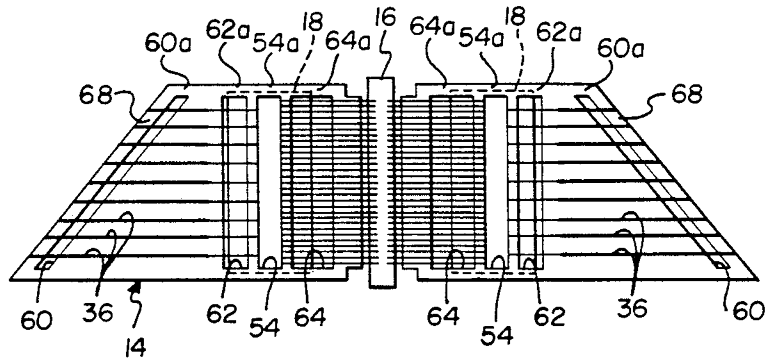
FIG. 5 is a plan view of an excised LED array assembly module, ready for mounting to a printhead support member.

After the TAB frame module has been tested and found to be satisfactory, extraneous film and conductor material is cut away, for example by a die cutting, laser cutting or water jet cutting operation, to produce the final assembly module, as shown in FIG. 4. Preferably, the cutting operation leaves narrow protective bands of film at both ends of the windows 54 and openings 60, 62, and 64, as shown respectively at numerals **54*a*, 60*a*, 62*a* and 64*a* in FIG. 5**.

It should be noted that the diode array chip 16 is slightly wider than any other portion of the assembly module so that slight angular adjustments can be made to a module during assembly of the printhead without causing contact or interference between the control chips or the TAB tapes. The diagonal angular configuration of the ends of the assembly module and the openings 60 allows the bonding sites on the circuit board to be spaced apart at least as far as are the widely spaced wires 36 and the spacing on the circuit boards can be further increased by making the angle more acute. Because the insulating TAB film is adjacent the circuit boards, wires 36 can traverse conductor paths on the circuit boards without risk of short circuiting. However, if it is desired to provide the wires on the face of the TAB film adjacent the circuit boards, additional insulating means, such as a dry film mask material, may be applied either to the TAB material or to the circuit boards to prevent short circuiting. It is important also to note that the ends of the TAB tape extend beyond the diagonal openings 60 so that the bonding regions of wires 36, within openings 60, are protected by bars 68 of plastic material at the ends of the modules, rather than simply extending beyond the ends of the plastic material in comb-like fashion, which makes the wire ends very susceptible to being accidentally bent or otherwise damaged.

To install the completed assembly module to the support member, adhesive material is applied to the lower faces of the chips and the module is positioned on the support member with the array chip adjusted accurately to its required position, whereupon all three chips are pressed against the support member and held in place until the adhesive cures or solidifies, which can be accelerated by heat or other means compatible with avoiding damage to the chips. Each subsequent assembly module is installed in the same manner with its array chip positioned in accurate alignment with the preceding chip and with the spacing between the adjacent end-most light emitting sites of the adjacent chips being substantially identical to that between all other pairs of adjacent light emitting sites. Various techniques can be used for facilitating these alignment and spacing procedures, for example, one edge and both ends of each array chip can be dressed accurately relative to the actual diode sites so that such requirements can be met when that edge of each diode is seated against the corresponding edge of shallow support member slot 20 and the adjacent ends of the diode chips are in intimate contact with one another. Alternatively, the ends of the chips can be made intentionally short enough to provide a slight space between adjacent chips when the corresponding end-most light emitter sites are properly spaced by an aligning device that uses microscope means to optically detect the relative locations of the new array and the previously mounted array, either by visual observation or by so-called machine-vision techniques.

The last step in the completion of the assembly module installation is to bond the wires 30 traversing diagonal openings 60 to the corresponding conductor strips 38 of the respective circuit boards 12, which is likewise accomplished by a known technique such as soldering, thermal compression bonding, thermosonic bonding or laser bonding.

After all of the required assembly modules have been mounted to the printhead and bonded to the circuit boards, as just described, the Selfoc lens assembly and appropriate housing components are added, whereupon the printhead assembly is complete and ready to be mounted in the machine and connected to external electronic power supply and control means.

We claim:

1. The method of making a module for an LED printhead having a plurality of LED array modules mounted end-to-end on a support member, each of said LED array modules comprising an LED array chip connected along each edge to one edge of a corresponding one of two control chips, and circuit board means carried by said support means and connected to the other edges of said control chip, said method comprising:

(a) preparing a TAB frame comprising a sheet of insulative plastic material supporting multiple internal conductive wires arranged to electrically connect an LED array chip to said two control chips spaced from said array chips at opposite sides thereof and multiple external conductive wires arranged to connect with opposite edges of said control chips and for subsequent connection with said circuit board means;

(b) providing windows in said TAB frame surrounded by said plastic material to respectively receive said LED array chip and said two control chips at opposite sides of said LED array chip and to expose those portions of said multiple conductive wires overlying the edges of said chips received in said windows and those portions of said wires connected to said control chip which are subsequently connected to said circuit board means;

(c) positioning said chips in respective ones of said openings and bonding the adjacent exposed conductive wire portions to said chips;

(d) electrically testing the testable module so fabricated on said TAB frame by means of said conductive wires; and (e) cutting said TAB frame to remove excess material and thereby provide an excised assembly module with said LED diode array located transversely across the center region thereof and extending at both sides slightly beyond the corresponding edges of the plastic material comprising the unsupported LED array module.

2. The method according to claim 1 in which said external wires includes test pads for electrically testing the module, said step of cutting said TAB frame including removing said test pads with said excess material.

* * * * *